United States Patent [19]

Yoshii et al.

[11] Patent Number: 4,680,720

[45] Date of Patent: Jul. 14, 1987

[54] DOT INTERPOLATION CONTROL SYSTEM

[75] Inventors: Jiro Yoshii, Saitama; Akira Komatsu; Hiroshi Ishii, both of Tokyo, all of Japan

[73] Assignee: Kabushiki Kaisha Toshiba, Kawasaki, Japan

[21] Appl. No.: 661,192

[22] Filed: Oct. 15, 1984

[30] Foreign Application Priority Data

| Oct. 17, 1983 | [JP] | Japan | 58-193752 |
| Oct. 17, 1983 | [JP] | Japan | 58-193753 |
| Oct. 17, 1983 | [JP] | Japan | 58-193754 |
| Oct. 17, 1983 | [JP] | Japan | 58-193755 |
| Oct. 17, 1983 | [JP] | Japan | 58-193756 |
| Oct. 17, 1983 | [JP] | Japan | 58-193757 |
| Oct. 17, 1983 | [JP] | Japan | 58-193758 |

[51] Int. Cl.$^4$ .......................... G06F 15/66; H04N 1/04
[52] U.S. Cl. ..................... 364/521; 364/518; 340/728; 358/282; 358/283; 358/287
[58] Field of Search ............. 364/518, 521, 519, 723; 358/282, 283, 287; 382/41, 47, 50, 56; 340/728, 731, 793

[56] References Cited

U.S. PATENT DOCUMENTS

| 3,573,789 | 4/1971 | Sharp | 340/728 |
| 3,781,849 | 12/1973 | Baron et al. | 340/730 |
| 3,868,673 | 2/1975 | Mau, Jr. et al. | 340/723 |
| 3,878,536 | 4/1975 | Gilliam | 340/728 |
| 3,918,039 | 11/1975 | Clark | 340/730 |
| 3,969,716 | 4/1976 | Roberts | 340/728 |
| 3,984,828 | 10/1976 | Beyers, Jr. | 340/730 |
| 4,063,232 | 12/1977 | Fernald | 340/791 |
| 4,119,954 | 11/1978 | Seitz et al. | 340/728 |
| 4,129,860 | 12/1978 | Yonezawa et al. | 340/728 |
| 4,242,628 | 12/1980 | Somerville | 382/50 |
| 4,280,144 | 4/1981 | Bacon | 358/280 |
| 4,321,626 | 3/1982 | Wada | 358/263 |
| 4,349,846 | 9/1982 | Sekigawa | 358/283 |
| 4,360,883 | 11/1982 | Ejiri et al. | 382/50 |
| 4,464,788 | 8/1984 | Sternberg et al. | 382/41 |
| 4,573,201 | 2/1986 | Hashiyama et al. | 382/56 |
| 4,578,812 | 3/1986 | Yui | 382/41 |

Primary Examiner—Gary Chin
Assistant Examiner—Daniel W. Juffernbruch
Attorney, Agent, or Firm—Cushman, Darby & Cushman

[57] ABSTRACT

A dot interpolation control system according to the invention includes a dot pattern memory storing character pattern data having a predetermined dot matrix format. Dot data of four adjacent dots is obtained from the dot pattern memory. X and Y off-set values of a position in an area surrounded by the four dots are stored using one of the dot data of four adjacent dots as a reference point. Dot interpolated value data in the area surrounded by the four dots is stored in an interpolating table ROM in accordance with all combination of ON- and OFF-states of the dot data of four adjacent dots. The dot data of four adjacent dots and the X and Y off-set values are supplied to the interpolating table ROM. A dot interpolated value at a coordinate point indicated by the off-set values is generated in correspondence with ON- and OFF-states of the four adjacent dots.

16 Claims, 13 Drawing Figures

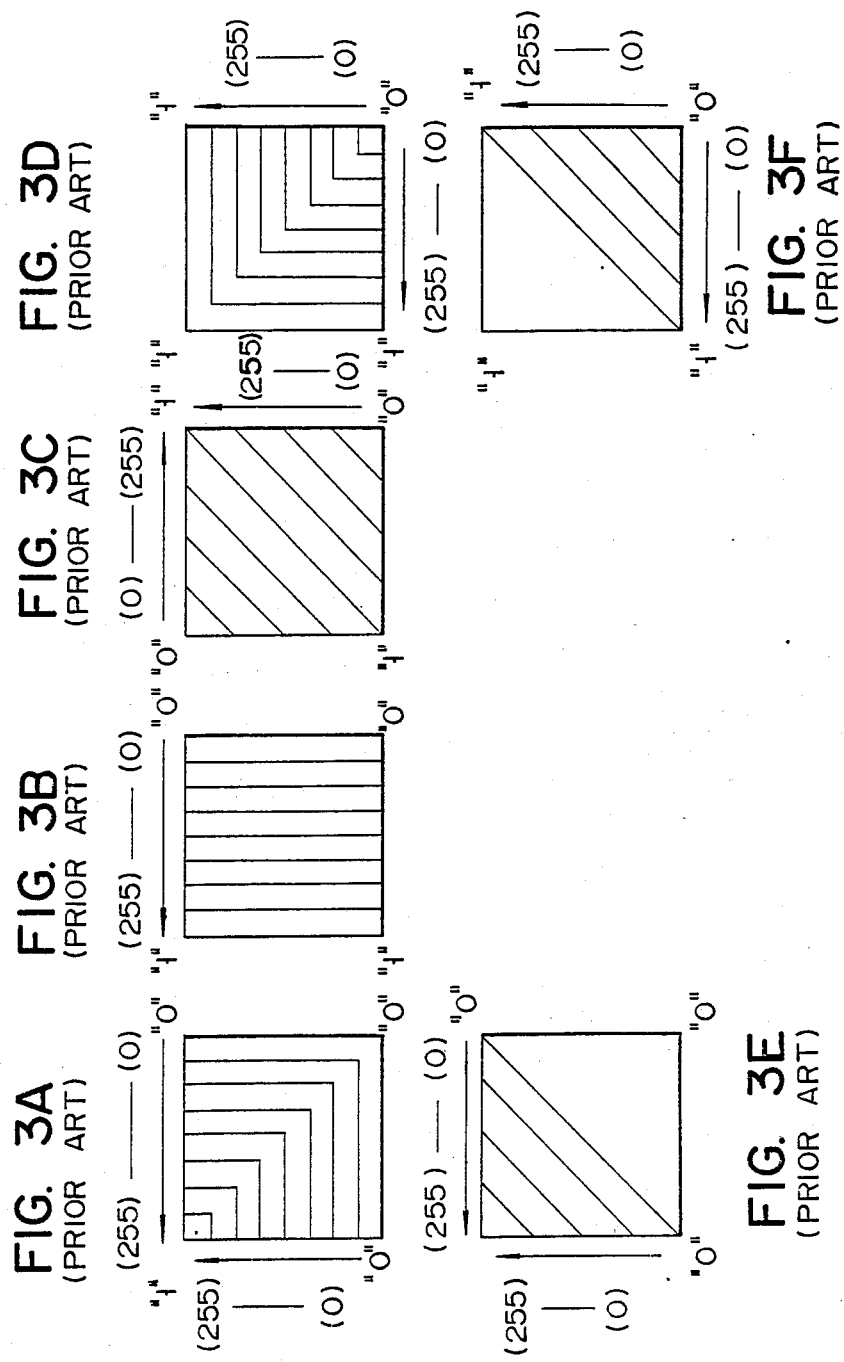

DOT INTERPOLATION CONTROL SYSTEM

BACKGROUND OF THE INVENTION

The present invention relates to a dot interpolation control system used in a wordprocessor, a character output apparatus, or the like which adopts character font data of a dot matrix format.

In apparatuses which adopt a character font of a specific dot matrix format, when a function for enlarging/reducing the character font of the dot matrix format at a predetermined magnification is provided, a so-called simple enlarging method in which some dots are simply added or erased to or from original character pattern dots sd is adopted.

Such a conventional enlargement/reduction means can be easily realized at relatively low cost. However, a generated pattern shape may not correspond to a desired character pattern (e.g., a ladder-like portion in an oblique line), resulting in unnatural character expression. In addition, in the above-mentioned conventional enlargement/reduction means, various modified fonts such as italics, rotated character, hollow character, bold line, and the like cannot be easily obtained, thereby limiting its application range.

SUMMARY OF THE INVENTION

It is an object of the present invention to provide a highly practical dot interpolation control system wherein, in an apparatus which adopts a character font of a specific dot matrix format, dot interpolation can be easily performed at a desired enlargement/reduction ratio while maintaining a high character quality, and various character modifications including compensation for an oblique line portion by halftone expression can be easily performed.

It is another object of the present invention to provide a character pattern emphasis control system wherein, in an apparatus which adopts a character font of a specific dot matrix format, a high-quality character modification can be obtained at a desired magnification including a high quality character pattern in which a hollow character is shaded.

It is still another object of the present invention to provide a character pattern emphasis control system which can easily express a character pattern of a standard dot matrix format at a desired magnification with a highly decorative effect, such that an edge portion and an inner portion of a character have different colors.

It is still another object of the present invention to provide a dot interpolated value generating system wherein, in a dot interpolating operation of a character pattern which is stored in a dot pattern memory, a dot interpolated value can be quickly generated at an optimum level in correspondence with interpolating dots positioned in respective grid regions of an original character pattern, thereby performing a dot interpolating operation having high character quality and high efficiency with a simple construction.

It is still another object of the present invention to provide a character pattern emphasis control system having a character modification function in which a hollow character having high character quality can be obtained from a character pattern of a standard dot matrix format at a desired enlargement/reduction rate.

In order to achieve the above objects of the present invention, there is provided a dot interpolating control system comprising:

a dot pattern memory for storing character pattern data consisting of a predetermined dot matrix format;

data obtaining means for obtaining dot data of four adjacent dots of a desired position from said dot pattern memory;

recognizing means for recognizing ON- and OFF-states of the dot data of four adjacent dots;

reading means for reading out dot data of surrounding dots surrounding the dot data of four adjacent dots, when a specific pattern state is recognized by said recognizing means; and dot interpolated value obtaining means for obtaining a dot interpolated value in a region surrounded by the dot data of four adjacent dots using the dot data of four adjacent dots and the dot data of the surrounding dots, when said specific pattern state is recognized by said recognizing means.

BRIEF DESCRIPTION OF THE DRAWINGS

Other objects and features of the present invention will be apparent from the following description taken in connection with the accompanied drawings, in which:

FIGS. 3A to 3F are respectively views showing the relationship between a dot pattern including four dots by one grid surrounding a new dot which is generated in the interpolating operation in the embodiment of FIG. 2, the level of an interpolated value which is set at an interpolating table ROM 40, and respective table types;

DETAILED DESCRIPTION OF THE PREFERRED EMBODIMENTS

Figure 1A:
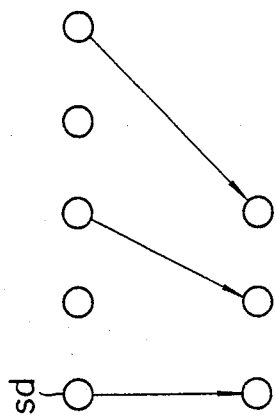
FIGS. 1A to 1C are respectively views for explaining conventional dot interpolating operations.
Figure 1B:
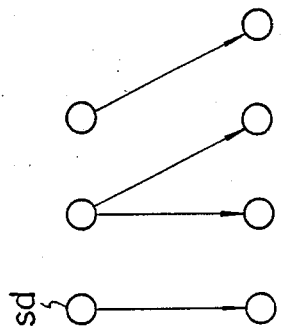
Figure 1C:
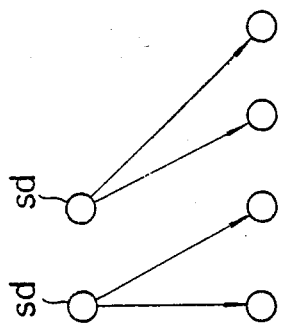
Figure 2:
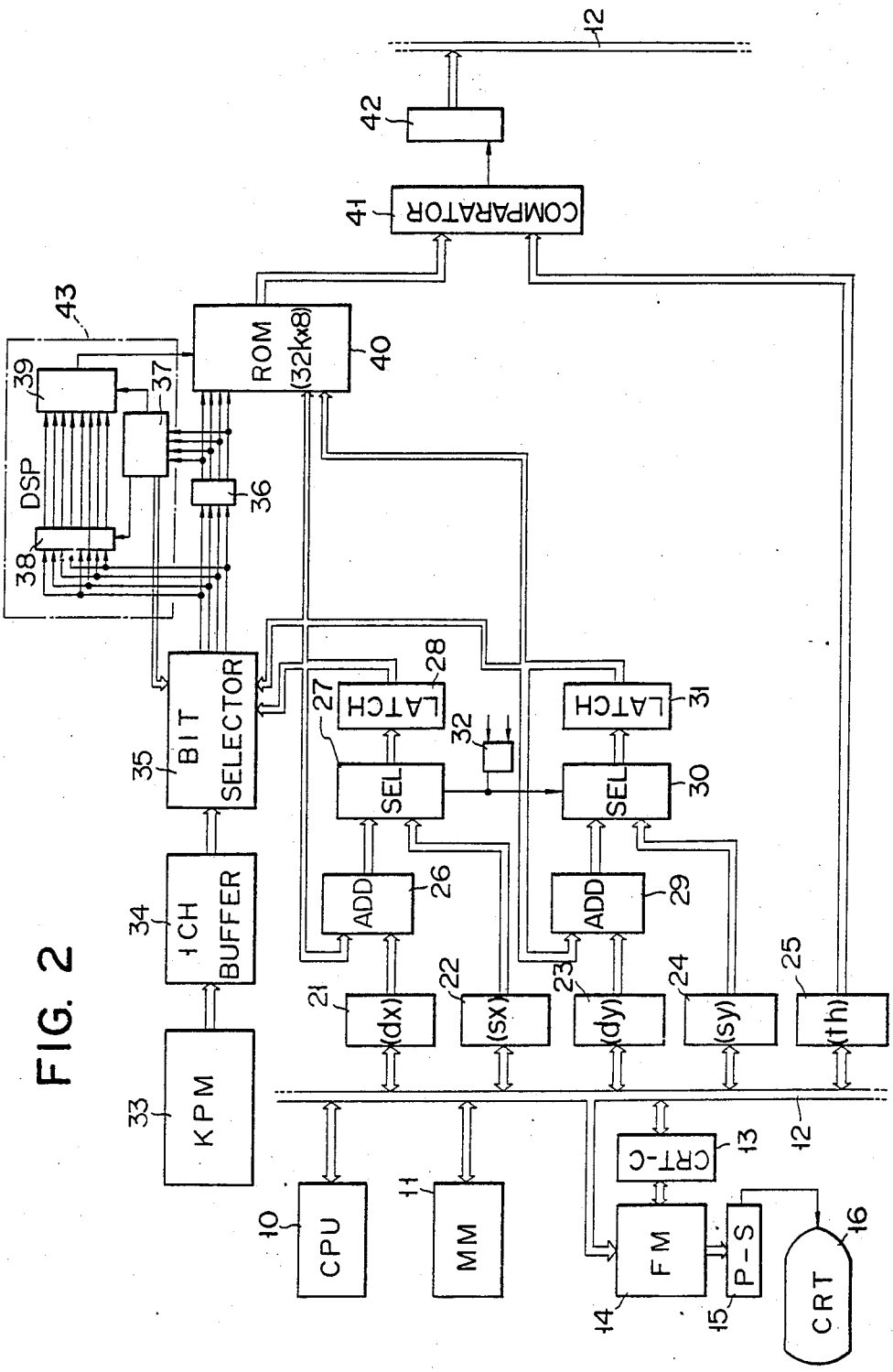
FIG. 2 is a block diagram showing an embodiment of the present invention.

FIG. 2 shows a block diagram of an embodiment of the present invention. This embodiment comprises a central processing unit (CPU) 10 which performs overall control of this system, a main memory (MM) 11, a CPU bus 12, a CRT controller (CRT-C) 13, a frame memory (FM) 14, a parallel-serial converter (P-S) 15 and a CRT display 16. Furthermore, input and output (I/0) registers 21 to 25 are connected to the CPU bus 12. The register 21 stores dot pitch data (dx) for dot interpolation along the X-direction. The register 22 stores an initial X address sx for dot interpolation. The register 23 stores dot pitch data (dy) for dot interpolation along the Y-direction. The register 24 stores an initial Y address for dot interpolation. The register 25 stores a threshold value (th) to be compared with an interpolated value to be described later. An adder (ADD) 26 adds the value (dx) of the register 21 to that of a latch circuit 28 to be described later. A data selector (SEL) 27 selects the value (sx) of the register 22 when the operation starts, and thereafter selects an output of the ADD 26. The latch circuit 28 stores a new dot X address (sx +i.dx) for dot interpolation which is expressed by an integral part and a decimal part and generated from the data selector 27. An adder 29 adds the value (dy) of the register 23 to that of a latch circuit 31 to be described later. A data selector 30 selects the value (sy) of the register 24 when the operation starts, and thereafter selects an output of the adder 29. The latch circuit 31 stores a new dot Y address (sy +j.dy) for dot interpolation which is expressed by an integral part and a decimal part and generated from the data selector 30. Switching control of the data selectors 27 and 30 respectively is performed by a control flip-flop 32. A low-speed kanji memory (KPM) 33 stores character pattern data of a predetermined dot matrix unit (e.g., 16×16 dots) including kanji. A one-character (1-ch) buffer 34 consists of a high-speed RAM and stores dot pattern data for one character read out from the KPM 33. In this case, the 1-ch buffer 34 stores the dot pattern data for one character including a bit pattern of off-dots ("0") surrounding it. A bit selector 35 selectively generates dot data of four dots of one grid surrounding a new dot in accordance with the values of the respective integral parts of the latch circuits 28 and 31 of the character pattern data stored in the 1-ch buffer 34. Four bit data generated from the bit selector 35 is latched by a latch circuit 36.

A dot pattern recognition processor (DSP) 43 recognizes a pattern of the dot data generated from the bit selector 35 and selectively controls the interpolated value of the new dot surrounded by four dots. This DSP 43 comprises a discrimination controller 37, a latch circuit 38 and a dot discriminator 39. The discrimination controller 37 determines a four-dot pattern state from a bit content of the latch circuit 36. When the controller 37 determines that this state is a predetermined dot pattern state to be described later, it controls the bit selector 35 so as to sequentially select dot data corresponding to two specific grids surrounding the four dots. The latch circuit 38 latches four-bit data read out by the controlling operation of the discrimination controller 37.

The dot discriminator 39 generates a one-bit interpolated value switching selection signal corresponding to the dot pattern state of the two grids read out by the controlling operation of the discrimination controller 37. An interpolating table ROM 40 generates an interpolated value (Qxy) of a new dot in an area surrounded by the dot data of four dots using a value of the decimal part (five-bit X off-set value) stored in the latch circuit 28, a value of the decimal part (five-bit Y off-set value) stored in the latch circuit 31, the dot data of four dots stored in the latch circuit 36, and the one-bit interpolated value switching selection signal generated from the dot discriminator 39 as input data. In this embodiment, this interpolating table ROM 40 uses a mask ROM of 256K (32K×8), and generates an interpolated value of 8 bits (0 to 255 levels) in accordance with the above-mentioned 15-bit address data. A comparator 41 compares the interpolated value generated from the interpolating table ROM 40 with the threshold value (th) stored in the register 25. When the interpolated value exceeds the threshold value (th), the comparator 41 generates an "H" level signal representing an on-dot (spot). An I/O register 42 sequentially stores the dot data generated from the comparator 41, and generates it on the CPU bus 12 every predetermined bit length (1 byte in this case).

FIGS. 3A to 3F are respectively views showing the relationship between the dot pattern of four dots of one grid surrounding a new dot generated in the interpolating operation, the level of the interpolated value which is set at the interpolating table ROM 40, and respective table types. It should be noted that the interpolated value is represented by brightness (bright-dark level) of 0 to 255 levels, and some divided areas are indicated by level lines.

Figure 4:
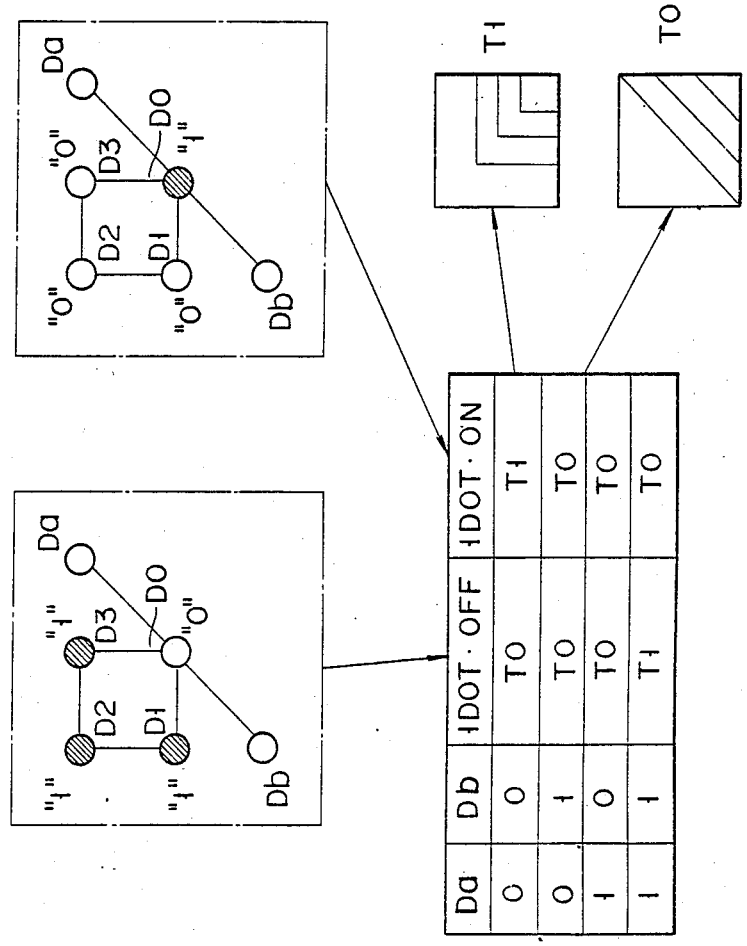
FIG. 4 is a view for explaining the selective switching operation of the respective table types.

FIG. 4 is a view for explaining examples of the selective switching operation of the respective table types when only one dot of the dot pattern of four dots of one grid is ON ("1") or OFF ("0"). The DSP 43 determines the ON or OFF state of predetermined dots (Da, Db) of surrounding grids when only one dot of four dots D0, D1, D2 and D4 is in the OFF state, i.e., "0" (e.g., in FIG. 4, the dot D0 indicated by a hollow circle). When Da and Db are "1", the DSP 43 selects a table T1 having level lines of corner type shown in FIG. 3D. On the other hand, when at least one of Da and Db is "0", the DSP 43 selects a table T0 having level lines of oblique line type shown in FIG. 3F. In this manner, the interpolated value of the new dot positioned in the area surrounded by the four dots is determined in accordance with a surrounding dot state when the four dots form the above specific pattern.

The operation of the system according to this embodiment will be described with reference to FIGS. 2 to 4 hereinafter. In the dot interpolating operation, the CPU 10 performs the initial setting operation of the registers 21 to 25, respectively. In other words, the CPU 10 sets the dot pitch data dx along the X-direction in the register 21, the initial X address sx in the register 22, the dot pitch data dy along the Y-direction in the register 23, the initial Y address sy in the register 24 and a comparing value for performing comparison with the interpolated value, i.e., the threshold value (th) in the register 25, respectively.

The dot pitch data of the registers 21 and 23 are respectively given as a reciprocal value of an enlargement/reduction ratio. $Ix\gamma=(dx-1)/2\gamma$ is set in the register 22 as the initial value sx, and $Iy\gamma=(dy-1)/2\gamma$ is set in the register 24 as the initial value sy. In this case, when dx or dy is below 1 (i.e., in the enlargement mode), Ix or Iy becomes negative and indicates an address other than an original character pattern storing area of the 1-ch buffer 34. On the other hand, when dx or dy exceeds 1 (in the reduction mode), Ix or Iy becomes positive and indicates an address in the original character pattern storing area of the 1-ch buffer 34. In the register 25, the comparing value of arbitrary level (0 to 255 level) is set to be compared with the interpolated value generated from the interpolating table ROM 40 for determining the level of the new dots which are to be ON (i.e., "1") dots.

Furthermore, the CPU 10 reads out the dot pattern data for one character which serves as an object to be dot-interpolated from the KPM 33, and writes it in the 1-ch buffer 34. In this case, the dot pattern data for one character which is to be dot-interpolated is stored in the 1-ch buffer 34 in the state wherein it is surrounded by OFF (i.e., "0") dots.

After performing the data setting operation in the respective registers 21 to 25 and the writing operation of the character pattern to be interpolated into the 1-ch buffer 34, the initial address data (sx, sy) stored in the registers 22 and 24 are selected by the selectors 27 and 30 under control of the control flip-flop 32, respectively, and are latched in the corresponding latch circuits 28 and 31. The integral parts of these dot address data stored in the latch circuits 28 and 31 are supplied to the bit selector 35, and the decimal parts thereof are supplied to the interpolating table ROM 40. The bit selector 35 selects the dot data of four dots of one grid from the 1-ch buffer 34 in accordance with the value of the integral parts, and supplies it to the interpolating table ROM 40. In the enlargement mode (i.e., dx, dy<1), since a negative value which indicates an address other than the original character pattern storing area of the 1-ch buffer 34 is supplied to the bit selector 35, the selector 35 starts the dot selecting operation from the dot data of four dots of one grid including dots other than the original character pattern storing area. On the other hand, in the reduction mode (i.e., dx, dy>1), since a positive value which indicates an address in the original character pattern storing area is supplied to the bit selector 35, the selector 35 starts the dot selecting operation from the dot data of four dots of one grid in the original character pattern storing area.

The interpolating table ROM 40 receives the respective X and Y off-set values (a sum is 10 bits) from the latch circuits 28 and 31, the dot data of four dots from the bit selector 35, and the one-bit interpolated value switching selection signal from the DSP 43 as input data, and generates an 8-bit interpolated value corresponding to the contents of these received signals. When the dot pattern of four dots of one grid generated from the bit selector 35 is recognized by the DSP 43 and represents the specific dot pattern as shown in FIG. 4, the DSP 43 recognizes the ON- or OFF-states of the specific dots of the surrounding grids, and generates the one-bit interpolated value switching selection signal corresponding to this dot state. For example, as shown in FIG. 4, when only one dot of the four dots D0, D1, D2 and D3 is OFF, i.e., "0" (e.g., in FIG. 4, D0 indicated by a hollow circle), the DSP 43 recognizes the ON- or OFF-states of the specific dots Da and Db of the surrounding grids. When Da and Db are "1", the DSP 43 selects the table T1 having level lines of corner type shown in FIG. 3D. On the other hand, when at least one of Da and Db is "0", the DSP 43 generates the interpolated value switching selection signal so as to select the table T0 having level lines of oblique line type as shown in FIG. 3F. When only one dot of the four dots D0, D1, D2 and D3 is ON, i.e., "1" (e.g., in FIG. 4, D0 indicated by an oblique line), the DSP 43 recognizes the ON- or OFF-states of the specific dots Da and Db of the surrounding grids. When Da and Db are "0", the DSP 43 selects the table T1 having level lines of corner type shown in FIG. 3A. On the other hand, when at least one of Da and Db is "1", the DSP 43 generates the interpolated value switching selection signal so as to select the table T0 having level lines of oblique line type shown in FIG. 3E. In this manner, when the four dots form the above-mentioned specific pattern, the interpolated value of the new dots positioned in the four-dot area is determined by the dot state of the surrounding grids. The 8-bit interpolated value (0 to 255 levels) generated from the interpolating table ROM 40 is supplied to the comparator 41 so as to be compared with the comparing value stored in the register 25, that is, the threshold value. When the interpolated value exceeds the threshold value, the comparator 41 generates a "1"-level signal representing an ON-dot. On the other hand, when the interpolated value is below the threshold value, the comparator 41 generates a "0"-level signal representing an OFF-dot.

On the other hand, after generating the interpolated value from the interpolating table ROM 40, contents of the latch circuit 28 and that of the register 21 are added to each other by the ADD 21, and contents of the latch circuit 31 and that of the register 23 are added to each other by the ADD 29. These sums are selected by the corresponding data selectors 27 and 30 and are latched by the latch circuits 28 and 31, respectively. Every time the interpolated value is generated from the interpolating table ROM 40, address data of the latch circuit 28 is updated in accordance with the value of the register 21 (i.e., the dot pitch data dx), and address data of the latch circuit 31 is also updated in accordance with the value of the register 23 (i.e., the dot pitch data dy).

In this manner, the interpolated values generated from the interpolating table ROM 40 are sequentially compared with the threshold value (th) of the register 25 by the comparator 41, thereby generating the new dot data.

The new dot data generated from the comparator 41 after the interpolating operation are sequentially stored in the register 42, and are generated on the CPU bus 12 every one byte. These new dot data generated on the CPU bus 12 after the interpolating operation are stored in a predetermined character pattern storing area in the MM 11 under the control of the CPU 10. These data are transmitted to the CRT-C 13 through the CPU bus 12 in units of characters so as to be stored in the FM 14, and, thereafter are displayed on the CRT display 15.

According to the dot interpolating operation as described above, the obtained character pattern has no ladder-like portion in the oblique line portion and can be very readable without a lack in a corner portion thereof. Therefore, high quality character expression which is close to the original character pattern can be performed. In addition, an enlargement/reduction ratio can be easily obtained. In this case, one or a plurality of registers 21 to 25 are arbitrarily designated so as to sequentially or selectively change their values under the control of the CPU 10, thereby easily performing the enlargement/reduction operation of characters. In addition to this, the character expressions such as long and flat characters at an arbitrary magnification, italics at an arbitrary angle, bottom aligned italics, rotated characters, and the like can be easily obtained, thereby performing a character modification with high quality. For example, if the values of the registers 21 and 23 are set to be 2:1, a long character having a double length width with respect to a width can be obtained. On the other hand, if the values of the registers 21 and 23 are set to be 1:1.2, a flat character having a width 1.2 times the length can be obtained. When the values of the register 22 are sequentially changed for every slice, desired italics can be obtained. Furthermore, if the values of the register 22 and 24 are sequentially changed, a character having a desired rotation angle can be obtained.

Subsequently, character pattern emphasis control having a character modification function in which a hollow character with high quality can be obtained at a desired enlargement/reduction ratio will be described with reference to FIG. 2. A detailed description of each portion having the same function as described above is omitted. In order to obtain two character patterns having different line widths for obtaining a hollow character, first and second comparing values (or threshold values) tha and thb respectively having different values are prepared. Then, the first comparing value (tha; where tha>thb) is set at the register 25.

The CPU 10 reads out dot pattern data for one character as an object of the hollow processing from the KPM 33, and writes it in the 1-ch buffer 34. An interpolated value generated from the interpolating table ROM 40 is compared with the first threshold value tha, thereby forming new dot data.

A first character pattern obtained from the comparator 41 is stored in a predetermined first character pattern storing area in the MM 11. Thereafter, the second threshold value thb lower than the first threshold value tha is subsequently set in the register 25 and the above operation is repeatedly performed by this threshold value thb. A second character pattern obtained from the comparator 41 using the threshold value thb as the comaparing value is stored in a predetermined second character pattern storing area of the MM 11. When the first and second character patterns are stored in the first and second character pattern storing areas, respectively, the CPU 10 superposes these patterns, thereby obtaining a hollow character pattern. In other words, the first and second character patterns are exclusive-ORed for every corresponding dots and the thus obtained dot pattern data is written in the first character pattern storing area. Therefore, the hollow character pattern in which the dots having the interpolated values tha through thb are ON (i.e., "1") is stored in the first character storing area of the MM 11.

The hollow character patterns stored in the first character pattern storing area of the MM 11 are transmitted through the CPU bus 12 to the CRT-C 13 in units of characters, and are stored in the FM 14. Thereafter, these patterns are displayed on the CRT display 15.

According to the hollow processing operation as described above, the hollow character pattern after the dot interpolating operation has no ladder-like portion in an oblique line portion and can be readable without a lack in a corner portion thereof, thereby performing a hollow character expression with high quality.

Next, the compensating operation for the oblique line portion by halftone display will now be described.

Figure 5:
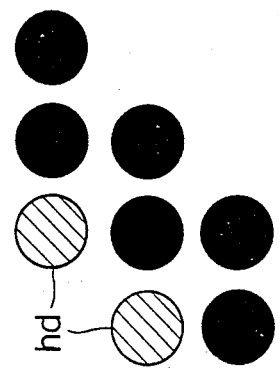
FIG. 5 is a view showing an interpolating example of a dot pattern by halftone display.

FIG. 5 shows a compensated example of a dot pattern by halftone display. In FIG. 5, reference symbol hd denotes halftone dots.

Figure 6:
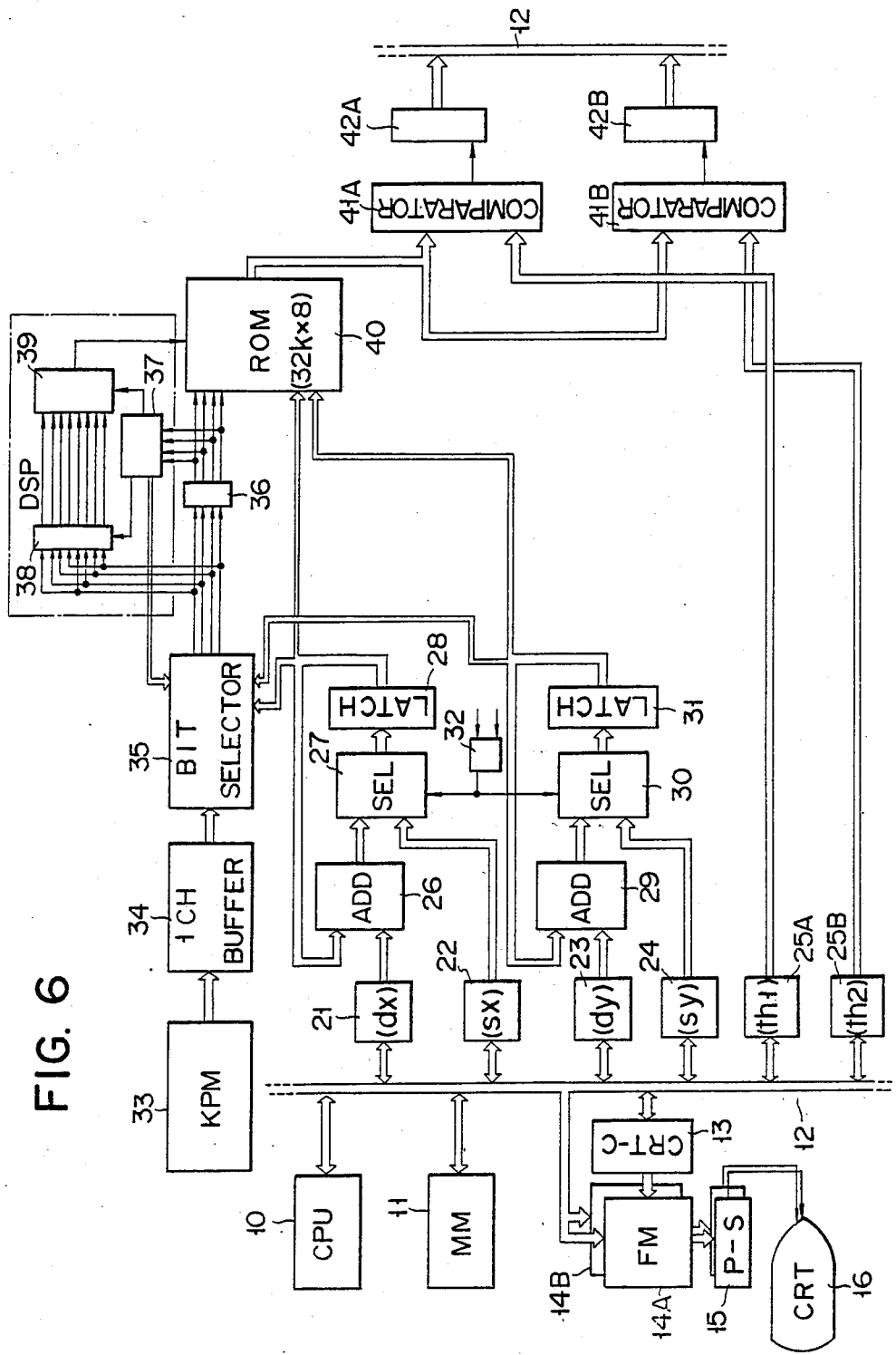
FIG. 6 is a block diagram showing another embodiment of the present invention.

FIG. 6 is another embodiment showing a compensated example of a dot pattern by halftone display.

The same reference numerals as in FIG. 2 denote the same parts as in FIG. 6 and a detailed description thereof is omitted. The embodiment shown in FIG. 6 is the same as the embodiment shown in FIG. 2 except that first and second frame memories 14A and 14B, and first and second registers 25A and 25B for holding threshold values th1 and th2 are provided, and first and second comparators 41A and 41B, and first and second registers 42A and 42B for holding the outputs of these comparators 41A and 41B are also provided.

In the dot interpolating operation, the CPU 10 respectively sets dot pitch data dx along the X-direction in the register 21, an initial value (an initial X address; sx) in the register 22, dot pitch data along the X-direction in the register 23, an initial value (an initial Y address; sy) in the register 24, and comparing values to be compared with interpolated values, that is, the threshold values th1 and th2 in the registers 25A and 25B. The comparing values having an arbitrary level (0 to 255 levels), i.e., the threshold values th1 and th2 are set in the registers 25A and 25B so as to be compared with the interpolated values generated from the interpolating table ROM 40 for determining the level of the new dots which are to be "ON" dots. Assume that th1 > th2, the threshold value th1 is set in the register 25A in order to obtain full tone dot data, and the threshold value th2 is set in the register 25B in order to obtain halftone dot data. Furthermore, the CPU 10 reads out the dot pattern data for one character which is to be dot-interpolated from the KPM 33, and writes it in the 1-ch buffer 34.

The procedure from the 1-ch buffer 34 to the interpolating table ROM 40 is the same as that in FIG. 2, and a detailed description thereof is omitted.

The 8-bit interpolated values (0 to 255 levels) generated from the interpolating table ROM 40 are supplied to the comparators 41A and 41B, respectively, and are compared with the threshold values stored in the corresponding registers 25a and 25B, respectively. When the interpolated values exceed the threshold values, the comparators 41A and 41B generate a "1" level signal representing an "ON"-dot. On the other hand, when the interpolated values are below the threshold values, the comparators 41A and 41B generate a "0" level signal representing an "OFF"-dot. Note that since th1 > th2, the full tone dot data is obtained from the comparator 41A and the halftone dot data is obtained from the comparator 41B. Thereafter, every time the interpolated values are generated from the interpolating table ROM 40 in the same manner as in FIG. 2, the address value of the latch circuit 28 is updated in accordance with the dot pitch data dx of the register 21, and the address values of the latch circuit 31 are updated in accordance with the dot pitch data dy of the register 23.

In this manner, the interpolated values generated from the interpolating table ROM 40 are sequentially compared with the threshold values th1 and th2 stored in the respective registers 25A and 25B by the comparators 41A and 41B, thereby forming the new full tone and halftone data, respectively.

The new dot data after the interpolating operation generated from the comparators 41A and 41B are stored in the corresponding registers 42A and 42B, respectively, and are then generated on the CPU bus 12 in units of bytes. The new dot data generated on the CPU bus 12 after the interpolating operation are sequentially stored in the predetermined character pattern storing areas of the MM 11 by the full tone data and the halftone data under control of the CPU 10. Thereafter, these data are respectively stored in the FM 14A and 14B under the control of the CRT-C 13. Then, these data are transmitted to a video circuit of the CRT display 16 through the P-S 15, and are synthesized therein so as to be displayed on the CRT display 16. Therefore, dots having interpolated values higher than the threshold value th1 stored in the register 25A are displayed on a screen of the CRT display 16 by full tone, and dots having the interpolated values falling within the range between the threshold value th1 stored in the register 25A and the comparing value th2 stored in the register 25B are displayed thereon by halftone. In this manner, a character accompanying a halftone portion is displayed with a designated enlargement/reduction ratio. More specifically, as shown in FIG. 5, character expression having a smooth inclined line in which a ladder-like narrow portion in an oblique line is expressed by halftone dots hd can be obtained.

The character pattern dots obtained from the comparator 41A and those obtained from the comparator 41B are exclusive-ORed, thereby easily obtaining a hollow character pattern.

A dot-interpolated character pattern can be obtained using only the comparator 41A. In this case, for example, a value $T\gamma = \{1-(SA/2)\}K$ where S is a reciprocal of an enlargement/reduction ratio, A is a minimum line width of a character pattern to be generated, and K is a maximum interpolated value) is set in the register 25A and a character pattern having an optimum line width with respect to an enlarged/reduced character can be thereby obtained.

According to the dot interpolating operation as described above, a character pattern after the dot interpolating operation has no ladder-like narrow portion in an oblique line portion and is very readable without a lack in a corner portion thereof. Therefore, character display which is very close to the original character pattern can be performed. In addition, an enlargement/reduction ratio and a plurality of tone strengths can be finely set, and therefore, a character of an arbitrary size can be obtained. Furthermore, one or a plurality of the registers 21 to 24, 25A and 25B are selectively designated and the values thereof are sequentially or selectively changed under the control of the CPU 10. Then, this allows not only enlargement/reduction of a character, but also a bold line, a thin line, a long character, a flat character, italics at a desired angle, bottom aligned italics, a rotated character, and additionally character modification with high performance can be achieved. For example, if the values of the registers 21 and 23 are set to be 2:1, a long character having a double length with respect to a width can be obtained. On the other hand, if the values of the registers 21 and 23 are set to be 1:1.2, a flat character having a width 1.2 times a length can be obtained. Furthermore, when the value of the register 22 is sequentially changed every one slice, a desired italicized character can be obtained. On the other hand, when the values of the registers 22 and 24 are sequentially changed, a character having a desired rotation angle can be obtained.

In the above embodiment, two pairs of circuits for obtaining the new dot data by comparing with the interpolated values are provided and two different dot data are simultaneously obtained from the two comparators 41A and 41B. However, the present invention is not limited to this configuration. For example, a pair of comparing means is provided and different comparing values are set, thereby obtaining a plurality of character patterns with respect to an identical character font.

A case for obtaining a character pattern having a halftone shaded portion will now be described.

In this case, the two threshold values are set to be th1 < th2. In order to obtain character pattern dots having a bold line width, the threshold value th1 is set in the register 25A, and in order to obtain character pattern dots having a fine line width, the threshold value th2 is set in the register 25B.

Furthermore, a dot pattern for one character which is to be dot-interpolated (e.g., original character pattern data for obtaining a hollow character having a shaded portion) is read out from the KPM 33, and is written in the 1-ch buffer 34. Note that the character pattern data stored in the 1-ch buffer 34 will be referred to a first character pattern hereinafter.

The interpolated values generated from the interpolating table ROM 40 are respectively compared with the threshold values th1 and th2 stored in the registers 25A and 25B by the comparators 41A and 41B, and corresponding new character pattern dots representing the bold and thin line widths are simultaneously formed.

The respective new dot data generated from the comparators 41A and 41B after the interpolating operation are stored in the corresponding registers 42A and 42B, and are generated on the CPU bus 12 in units of bytes. The new dot data generated on the CPU bus 12 after the interpolating operation are respectively stored in first and second predetermined storing areas in the MM 11 according to patterns of the bold and thin lines. Note that the character pattern data of the bold line width stored in the first character pattern storing area will be referred to a second character pattern hereinafter, and the character pattern data which is formed by shifting the second character pattern data along the designated parallel direction by one or more dots will be referred to third character pattern data hereinafter. A character pattern which is formed by superposing these second and third character patterns will be referred to a fourth character pattern, and the character data of the thin line width stored in the second character pattern storing area will be referred to a fifth character pattern hereinafter.

When the second and fifth character patterns are stored in the first and second character pattern storing areas, respectively, in order to generate a shaded portion pattern, the CPU 10 superposes (exclusive-ORs) the second character pattern with the dots (the third character pattern) having addresses which are parallel-shifted along a designated direction by the predetermined number of dots, and writes the superposed dot data in the above addresses, thereby obtaining the fourth character pattern. Then, the fourth character pattern which is rewritten on the first character pattern storing area and the fifth character pattern stored in the second character pattern storing area are exclusive-ORed at the identical dot position so as to remove the fifth character pattern of the thin line width from the fourth character pattern, that is, so as to obtain a sixth character pattern of the hollow character having the shaded portion. The sixth character pattern is written in the first or second character pattern storing area, and thereafter is transmitted to the first FM 14A.

Therefore, the hollow character having the shadow portion can be displayed on the screen of the CRT display 16 at a designated enlargement ratio with a smooth oblique line portion.

When the second character pattern and the fourth character pattern are exclusive-ORed to obtain the shaded portion pattern, only the shaded portion can be represented by halftone. The second character pattern and the fifth character pattern are exclusive-ORed to obtain a hollow character pattern, and this hollow character pattern is stored in the first FM 14A of full tone. Then, the second character pattern and the fourth character pattern are exclusive-ORed to obtain the shaded portion pattern, and this pattern is stored in the second FM 14B of halftone. Thereafter, the full and halftone character patterns in the respective FMs 14A and 14B are synthesized, thereby obtaining a character pattern only having a halftone shadow portion.

Character pattern emphasis control which can easily express edge and inner portions in different colors with high character modification effect will now be described.

Note that the threshold values are set to be th1 < th2, and the threshold value th1 for obtaining character dots of a bold line width is set in the register 25A and the threshold value th2 for obtaining character dots of a thin line width is set in the register 25B.

Furthermore, the CPU 10 reads out a dot pattern for one character which is to be dot-interpolated, i.e., original character pattern data for obtaining a modified character having different colored edge and inner portions from the KPM 33 and writes it in the 1-ch buffer 34. When the respective character patterns of the bold and thin line width are stored in the first and second character pattern storing areas, respectively, the CPU 10 transfers the character patterns of the bold and thin line widths to the first and second FMs 14A and 14B, respectively. The respective character patterns stored in the first and second FMs 14A and 14B are transmitted to the P-S 15 under the control of the CRT-C 13 and are synthesized therein. Thereafter, these patterns are displayed on the CRT display 16. The character pattern portions of the thin line width are displayed with a third color which is formed by synthesizing first and second colors, and a surrounding pattern portion of the bold line width is displayed with a first color. In this manner, the edge portion is displayed having a different color from that of the inner portion.

Emphasized characters having different colored edge portions from that of inner portions can be displayed on the screen of the CRT display 16 with high emphasis effect, and desired characters can be provided at an arbitrary enlargement ratio so as to have smooth oblique line portions, thereby considerably improving character quality and an enlargement/reduction function.

In the above embodiment, in order to compare interpolated values and to obtain new dot data, two pairs of circuits are provided, thereby simultaneously obtaining two kinds of dot data from two comparators 41A and 41B. However, when only one comparator is provided and a comparing value is changed, a plurality of kinds (e.g., bold and fine line widths) of character patterns with respect to the identical font can be sequentially obtained.

What is claimed is:

1. A dot interpolation control system comprising:
    a dot pattern memory for storing character pattern data formed in a predetermined dot matrix format;
    recognizing means for recognizing ON- and OFF-states of dot data of four adjacent dots of a desired position from said dot pattern memory;
    memory means for storing data representing a position of a region surrounded by said four adjacent dots in terms of an X-direction offset and a Y-direction offset, with one of said four adjacent dots being a reference dot;
    dot interpolation value generating means for, when said recognizing means recognizes, based on said X- and Y-direction offsets, that only one of said four adjacent dots is at an ON-state, outputting that content of either a first interpolation table or a second interpolation table which is specified by coordinates represented by said offsets, in accordance with dot data of those two of dots lying on a diagonal line, passing said ON-state dot but not passing any of the remaining three dots, which are adjacent to said On-state dot; for, when two of said four adjacent dots are at an ON-state, outputting that content of either a third interpolation table or a fourth interpolation table which is specified by coordinates represented by said offsets, depending on whether or not said two dots lie on a diagonal line; and for, when three of said four adjacent dots are at an ON-state, outputting that content of either said first interpolation table or said second interpolation table which is specified by coordinates represented by said offsets, in accordance with dot data of those two of dots lying on a diagonal line, passing the remaining OFF-state dot but not passing any of said three ON-state dots, which are adjacent to said OFF-state dot;
    threshold value memory means for storing a threshold value; and
    comparator means for comparing a dot interpolation value from said dot interpolation value generating means with said threshold value from said threshold value memory means, and for producing a signal indicative of said ON-state dot, when said interpolation value exceeds said threshold value.

2. A system according to claim 1, further comprising:
    means for setting a first threshold value into said threshold value memory means and providing a first character pattern having a bold-line width;
    means for setting a second threshold value, smaller than said first threshold value, into said threshold value memory means and providing a second character pattern having a thin-line width; and
    means for obtaining an exclusive OR of said first and second character patterns so as to provide a hollow-character dot pattern.

3. A system according to claim 2, wherein said threshold value memory means comrpises at least first threshold value memroy means for storing a first threshold value for obtaining dot data with a full tone, and second threshold memory means for storing a second threshold value for obtaining dot data with a half tone; and said comparator means comprises at least first comparator means for comparing said interpolation value from said dot interpolation value generating means with said first threshold value from said first threshold value memory means and producing a signal indicative of a full-tone ON-state dot when said interpolation value exceeds said first threshold value, and second comparator means for comparing said interpolation value from said dot interpolation value generating measn with said second threshold value from said second threshold value memory means and producing a signal indicative of a full-tone ON-state dot when said interpolation value exceeds said second threshold value.

4. A system according to claim 3, further comprising:
    a first frame memory for storing said first character pattern with a bold-line width in a dispaly pattern with a first hue;
    a second frame memory for storing said second character pattern with a thin-line width in a display pattern with a second hue;
    means for synthetizing content of said first and second frame memories; and
    dispaly means for displaying said second character pattern with a thin-line width in a third hue, obtained by synthesizing said first and second hues, and for displaying said first character pattern with a bold-line width surrounding said second character pattern in said first hue.

5. A system according to claim 2, further comprising:
    a first frame memory for storing said first character pattern with a bold-line width in a display pattern with a first hue;
    a second frame memory for storing said second character pattern with a thin-line width in a display pattern with a second hue;
    means for synthesizing contents of said first and second frame memories; and display means for displaying said second character pattern with a thin-line width in a third hue, obtained by synthesizing said first and second hues, and for displaying said first character pattern with a bold-line width surrounding said second character pattern in said first hue.

6. A system according to claim 1, wherein said threshold value memory means comprises at least first threshold value memory means for storing first threshold value for obtaining dot data with a full tone, and second threshold memory means for storing a second threshold value for obtaining dot data with a half tone; and said comparator means comprises at least first comparator means for comparing said interoplation value from said dot interpolation value generating means with said first threshold value from said first threshold value memory means and producing a signal indicative of a full-tone ON-state dot when said interpolation value exceeds said first threshold value, and second comparator means for comparing said interpolation value from said dot interpolation value generating means with said second threshold value from said second threshold value from said second threshold value memory means and producing a signal indicative of a full-tone ON-state dot when said interpolation value exceeds said second threshold value.

7. A system according to claim 6, further comprising:
a first frame memory for storing said first character pattern with a bold-line width in a display pattern with a first hue;
a second frame memory for storing said second character pattern with a thin-line width in a display pattern with a second hue;
means for synthesizing contents of said first and second frame memories; and
dispaly means for displaying said second character pattern with a thin-line width in a third hue, obtained by synthesizing said first and second hues, and for displaying said first character pattern with a bold-line width surrounding said second character pattern in said first hue.

8. A dot interpolation control system for performing a dot interpolation on a character pattern formed in a specific dot matrix format, at least along an X-direction or a Y-direction, said system comprising:
first memory means for storing an X-direction initial value, obtained when the dot interpolation is performed;
second memory means for storing X-direction dot pitch data;
X-direction dot interpolation position generating means for adding contents of said first and second memory means to generate data of an X-direction component of a dot interpolation position, which consists of an integer portion and a decimal portion;
third memory means for storing a Y-direction initial value, obtained when the dot interpolation is performed;
fourth memory means for storing a Y-direction dot pitch data;
Y-direction dot interpolation position generating means for adding contents of said third and fourth memory means to generate data of a Y-direction component of the dot interpolation position, which consists of an integer portion and a decimal portion;
dot data selecting means for selecting dot data of four dots in one grid, which includes the dot interpolation position, selected in accordance with said integer portions of said X-direction and Y-direction components respectively generated by said X-direction dot interpolation position generating means and said Y-direction dot interpolation position generating means;
dot pattern recognizing means for recognizing a pattern of said dot data selected by said dot data selecting means and generating an interpolation value selection signal for selectively changing an interpolation value of a new dot surrounded by said four dots of one grid;
fifth memory means for storing a threshold value;
an interpolation table ROM for receiving said decimal portions of said X-direction and Y-direction components respectively generated by said X-direction dot interpolation position generating means and said Y-direction dot interpolation position generating means, said dot data of said four dots from said dot data selecting means, and said interpolation value selection signal from said dot pattern recognizing means, and for generating an interpolation value of a new dot in a region surrounded by said for dots in one grid in accordance with said dot data of said four dots and said interpolation value selection signal; and
comparator means for comapring said interpolation value from said interpolation table ROM with said threshold value stored in said fifth memory means, and for producing a signal indicative of an ON-state dot when said interpolation value exceeds said threshold value.

9. A system according to claim 8, further comprising:
means for setting a first threshold value into said fifth memory means and providing a first character pattern having a bold-line width;
means for setting a second threshold value, smaller than said first threshold value, into said fifth memory means and providing a second character pattern having a thin-line width; and
means for obtaining an exclusive OR of said first and second character patterns so as to provide a hollow character dot pattern.

10. A system according to claim 9, wherein said fifth memory means comprises at least first threshold value memory means for storing a first threshold value for obtaining dot data with a full tone, and second threshold memory means for storing a second threshold value for obtaining dot data with a half tone; and said comparator means comprises at least first comparator means for comparing said interpolation value from said interpolation table ROM with said first threshold value from said first threshold value memory means and producing a signal indicative of a full-tone ON-state dot when said interpolation value exceeds said first threshold value, and second comparator means for comparing said interpolation value from said interpolation table ROM with said second threshold value from said second threshold value memory means and producing a signal indicative of a full-tone ON-state dot when said interpolation value exceeds said second threshold value.

11. A system according to claim 10, further comprising:
a first frame memory for storing said first character pattern with a bold line width in a display pattern with a first hue;

a seocnd frame memory for storing said second character pattern with a thin-line width in a display pattern with a second hue;

means for synthesizing contents of said first and second frame memories; and dispaly means for displaying said second character pattern with a thin-line width in a third hue, obtained by synthesizing said first and second hues, and for displaying said first character pattern with a bold-line width surrounding said second character pattern in said first hue.

12. A system according to claim 1, further comprising:

a first frame memory for storing said first character pattern with a bold-line width in a display pattern with a first hue;

a second frame memory for storing said second character pattern with a thin-line width in a display pattern with a second hue;

means for synthesizing contents of said first and second frame memories; and display means for displaying said second character pattern with a thin-line width in a third hue, obtained by synthetizing said first and second hues, and for displaying said first character pattern with a bold-line width surrounding said second character pattern in said first hue.

13. A system according to claim 8, wherein said fifth memory means comprises at least first threshold value memory means for storing a first threshold value for obtaining dot data with a full tone, and second threshold memory means for storing a second threshold value for obtaining dot data with a half tone; and said comparator means comprises at least first comparator means for comparing said interpolation value from said interpolation table ROM with said first threshold value from said first threshold value memory means and producing a signal indicative of a full-tone ON-state dot when said interpolation value exceeds said first threshold value, and second comparator means for comparing said interpolation value from said interpolation table ROM with said second threshold value from said second threshold value memory means and producing a signal indicative of a full-tone ON-state dot when said interpolation value exceeds said second threshold value.

14. A system according to claim 13, further comprising:

a first frame memory for storing said first character pattern with a bold-line width in a display pattern with a first hue;

a second frame memory for storing said second character pattern with a thin-line width in a display pattern with a second hue;

means for synthesizing contents of said first and second frame memories; and display means for displaying said second character pattern with a thin-line width in a third hue, obtained by synthesizing said first and second hues, and for displaying said first character pattern with a bold-line width surrounding said second character pattern in said first hue.

15. A dot pattern interpolation system, comprising:

a dot pattern memory for storing character pattern data consisting of a predetermined dot matrix format;

dot data obtaining means for obtaining dot data of four adjacent dots of a desired position from said dot pattern memory;

interpolated value obtaining means for obtaining an interpolated value consisting of a plurality of bits in a region surrounded by said four adjacent dots from said dot data of said four adjacent dots;

memory means for storing a comparing value for making a comparison with said interpolated value; and interpolated value compared means for comparing said interpolated value with said comparing value, and obtaining a discrimination output representing an OFF-dot, or ON-dot, said discrimination output being controlled by changing said comparing value stored in said memory means and said comparing value of said memory means being changed in accordance with an enlargement/reduction ratio for said dot pattern.

16. A dot pattern interpolation system, comprising:

a dot pattern memory for storing character pattern data consisting of a predetermined dot matrix format;

dot data obtaining means for obtaining dot data of four adjacent dots of a desired position from said dot pattern memory;

interpolated value obtaining means for obtaining an interpolated value consisting of a plurality of bits in a region surrounded by said four adjacent dots from said dot data of said four adjacent dots;

memory means for storing a comparing value for making a comparison with said interpolated value; and interpolated value comparing means for comparing said interpolated value with said comparing value, and obtaining a discrimination output representing an OFF-dot, or ON-dot, said discrimiation output being controlled by changing said comparing value stored in said memory means and said comparing value of said memory means being changed in accordance with an enlargement/reduction ratio for said dot pattern;

wherein a value T, which satisfies a relation $T=[1-(SA/2)]K$ where S is a reciprocal of the enlargement/reduction ratio, A is a minimum line width of a generated character pattern and K is a maximum interpolated value, is set in said memory means storing said comparing value.

* * * * *